Patented June 13, 1950

2,511,231

UNITED STATES PATENT OFFICE 2,511,231

1-CYANOPHENYL-3-ACYLAMINO-5-PYRAZO-LONE COUPLERS FOR COLOR PHOTOGRAPHY

Arnold Weissberger, Paul W. Vittum, and Charles O. Edens, Rochester, N. Y., assignors to Eastman Kodak Company, Rochester, N. Y., a corporation of New Jersey No Drawing. Application March 26, 1949, Serial No. 83,762

16 Claims. (Cl. 95—6)

This invention relates to photography and particularly to compounds which form dyes on coupling with the developing agent to produce colored images.

It is known that colored photographic images may be formed by using a developer which produces a colored compound on development. The colored compound thus formed is deposited adjacent the silver grains of the silver image during development. In is also known that a colored image may be formed by adding to said developer solution or by incorporating in the silver halide emulsion before or after exposing a compound which couples during development with the oxidation product of the developing agent and which forms a colored compound which is likewise deposited adjacent the silver grains of the silver image during development. Such a compound which is employed in conjunction with a developing agent for the silver and which couples with the oxidation product of the developing agent during development is referred to herein as a coupling compound or coupler.

The present invention concerns new or improved color-forming developers comprising a primary aromatic amino developing agent and a coupler as hereinafter defined, and also includes a new or improved color development process which consists in developing a reducible silver salt image in a photographic element with the aid of a primary aromatic amino developer and in the presence of a coupler as hereinafter defined. It also includes photographic sensitive elements having such couplers in one or more emulsion layers.

We have found that compounds of the following structure are valuable couplers for color photography and produce magneta images of improved absorption characteristics on color development.

$$\text{R—N} \underset{\text{CO—CH}_2}{\overset{\text{N=C—NH—R'}}{\diagup}}$$

where R is a mononuclear cyano aryl radical and R' is a carboxylic acid acyl radical.

The compounds of our invention are prepared, in general, by condensing a cyano aryl hydrazine with ethyl β-ethoxy-β-imino-propionate to form an ethyl-β-(p'-cyanoaryl) hydrazino-β-imino propionate and ring closure of the latter with sodium ethoxide. The amino compound is acylated in the usual manner to form the acylamino pyrazolones.

If the reaction of the aminopyrazolone with the acid chloride takes place not only on the amino group but also, and in addition, on the OH group of the enolized pyrazolone (1-p-cyanophenyl)-3-amino-5-hydroxypyrazole), the pyrazolone can be obtained by hydrolysis of the enol ester in the usual manner, e. g. by means of alkali or acid. J. Am. Chem. Soc. 66, 1849 (1944).

The following compounds are useful as couplers according to our invention.

1.

1-(p-cyanophenyl)-3-acetamido-5-pyrazolone

2.

1-(p-cyanophenyl)-3-benzamido-5-pyrazolone

3.

1-(p-cyanophenyl)-3-(o-terphenyl-4'-carbamido)-5-pyrazolone

4.

1-(p-cyanophenyl)-3-(2',4'-di-tert.-amylphenoxyacetamido)-5-pyrazolone

5.

1-(p-cyanophenyl)-3-{[4-(2'',4''-di-tert.-amylphenoxy)-phenyl]-carbamyl-n-valeramido}-5-pyrazolone

6.

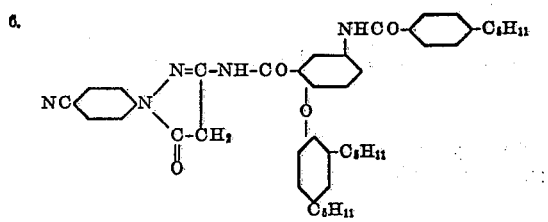

1-(p-cyanophenyl)-3-[2'-(2'',4''-di-tert.amylphenoxy)-5'-(p''-sec.amylbenzamido)-benzamido]-5-pyrazolone

7.

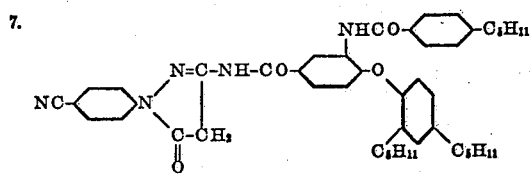

1-(p-cyanophenyl)-3-[4'-(2'',4''-diamylphenoxy)-3'-(p-sec.-amylbenzamido)-benzamido]-5-pyrazolone

8.

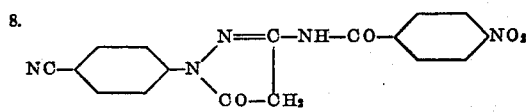

1-(p-cyanophenyl)-3-(4'-nitrobenzamido)-5-pyrazolone

9.

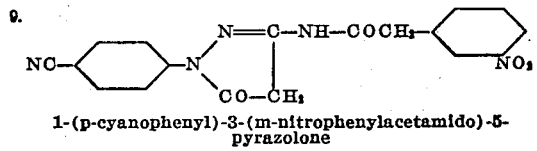

1-(p-cyanophenyl)-3-(m-nitrophenylacetamido)-5-pyrazolone

10.

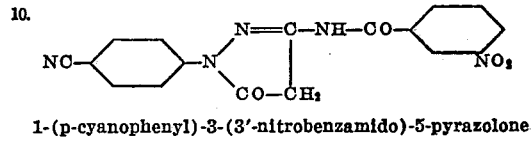

1-(p-cyanophenyl)-3-(3'-nitrobenzamido)-5-pyrazolone

11.

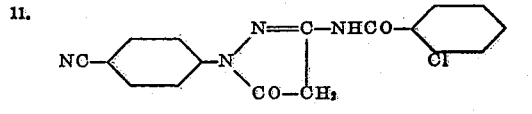

1-(p-cyanophenyl)-3-(2'-chlorobenzamido)-5-pyrazolone

12.

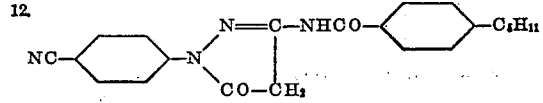

1-(p-cyanophenyl)-3-(4'-sec.amylbenzamido)-5-pyrazolone

13.

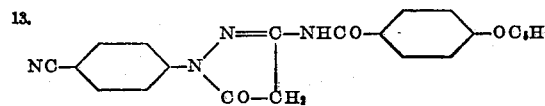

1-(p-cyanophenyl)-3-(4'-n-amoxybenzamido)-5-pyrazolone

14.

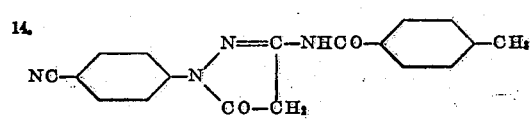

1-(p-cyanophenyl)-3-(p-toluamido)-5-pyrazolone

15.

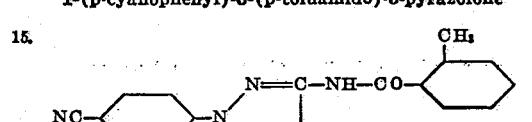

1-(p-cyanophenyl)-3-(o-toluamido)-5-pyrazolone

16.

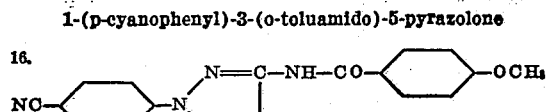

1-(p-cyanophenyl)-3-(p-methoxybenzamido)-5-pyrazolone

17.

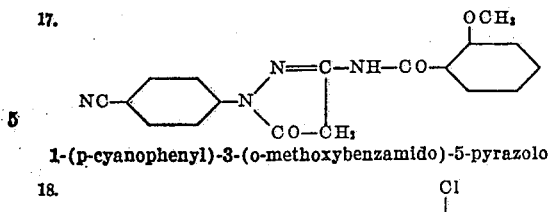

1-(p-cyanophenyl)-3-(o-methoxybenzamido)-5-pyrazolone

18.

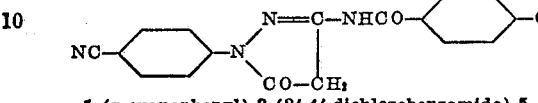

1-(p-cyanophenyl)-3-(2',4'-dichlorobenzamido)-5-pyrazolone

19.

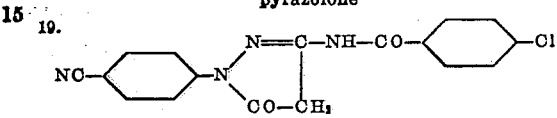

1-(p-cyanophenyl)-3-(p-chlorobenzamido)-5-pyrazolone

20.

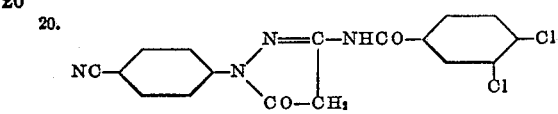

1-(p-cyanophenyl)-3-(3',4'-dichlorobenzamido)-5-pyrazolone

21.

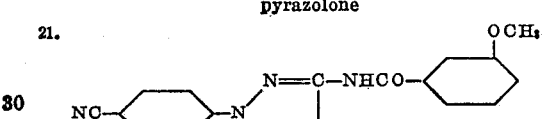

1-(p-cyanophenyl)-3-(m-methoxybenzamido)-5-pyrazolone

22.

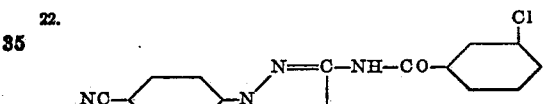

1-(p-cyanophenyl)-3-(m-chlorobenzamido)-5-pyrazolone

23.

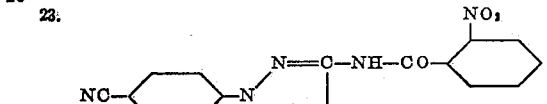

1-(p-cyanophenyl)-3-(o-nitrobenzamido)-5-pyrazolone

24.

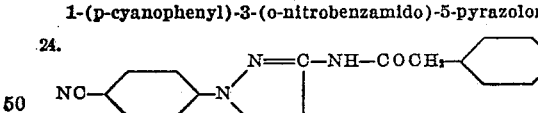

1-(p-cyanophenyl)-3-phenylacetamido-5-pyrazolone

25.

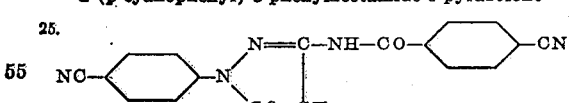

1-(p-cyanophenyl)-3-(p-cyanobenzamido)-5-pyrazolone

26.

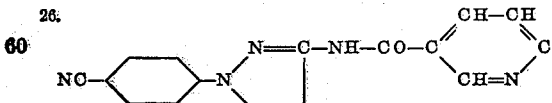

1-(p-cyanophenyl)-3-nicotinamido-5-pyrazolone

27.

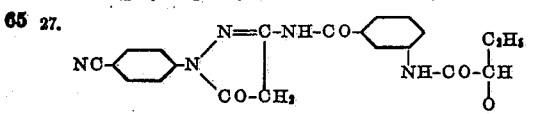

1-(p-cyanophenyl)-3-{3'-[α-(2'',4''-di-tert. amylphenoxy)-butyramido]-benzamido}-5-pyrazolone

28.

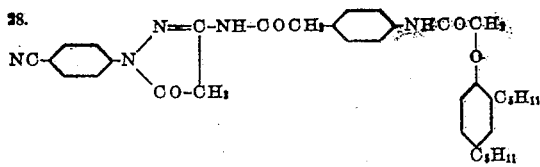

1-(p-cyanophenyl)-3-[4'-(2'',4''-di-tert. amylphenoxyacetamido)-phenylacetamido]-5-pyrazolone

29.

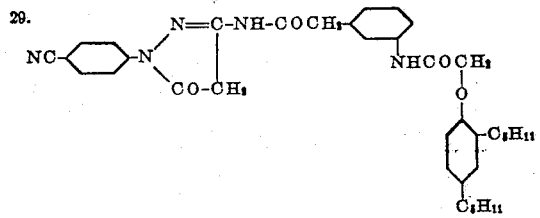

1-(p-cyanophenyl)-3-[3'-(2'',4''-di-tert. amylphenoxyacetamido)-phenylacetamido]-5-pyrazolone

30.

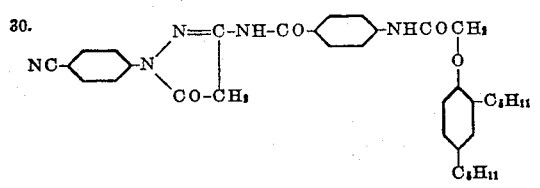

1-(p-cyanophenyl)-3-[4'-(2'',4''-di-tert. amylphenoxy)acetamidobenzamido]-5-pyrazolone

31.

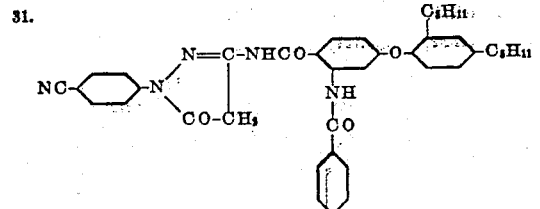

1-(p-cyanophenyl)-3-[4'-(2'',4''-di-tert. amylphenoxy)-3'-(4''-methylbenzamido)-benzamido]-5-pyrazolone

32.

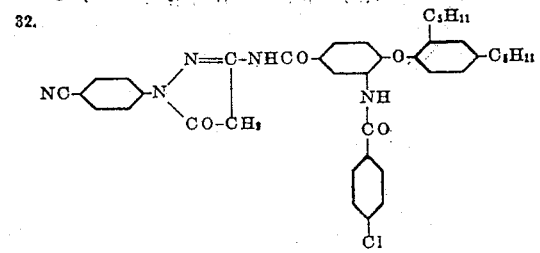

1-(p-cyanophenyl)-3-[4'-(2'',4''-di-tert. amylphenoxy)-3'-(4''-chlorobenzamido)-benzamido]-5-pyrazolone.

33.

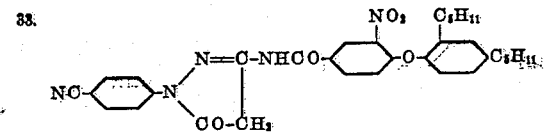

1-(p-cyanophenyl)-3-[4'-(2'',4''-di-tert. amylphenoxy)-3'-nitrobenzamido]-5-pyrazolone

34.

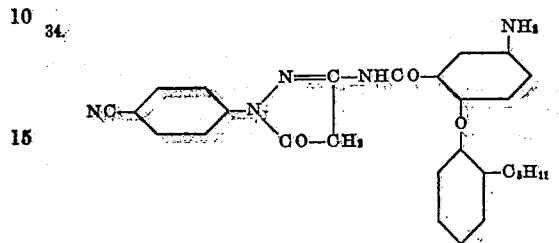

1-(p-cyanophenyl)-3-[2'-(2'',4''-di-tert. amylphenoxy)-5'-aminobenzamido]-5-pyrazolone

35.

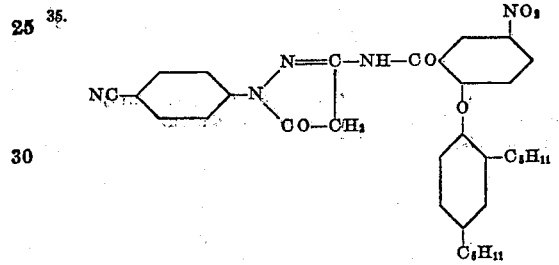

1-(p-cyanophenyl)-3-[2'-(2'',4''-di-tert. amylphenoxy)-5'-nitrobenzamido]-5-pyrazolone

36.

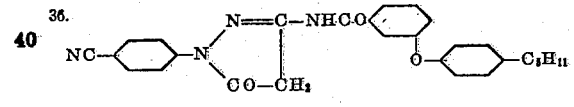

1-(p-cyanophenyl)-3-[3'-(4''-tert. amylphenoxy)-benzamido]-5-pyrazolone

37.

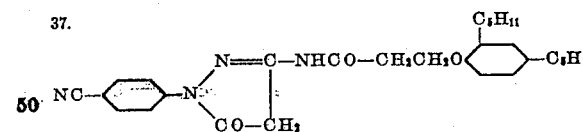

1-(p-cyanophenyl)-3-[β-(2',4'-di-tert. amylphenoxy)-propionamido]-5-pyrazolone

38.

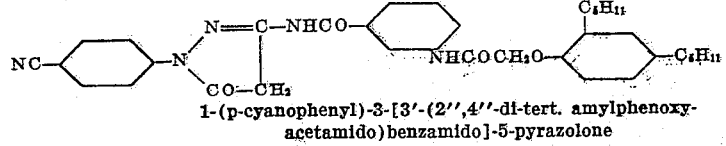

1-(p-cyanophenyl)-3-[3'-(2'',4''-di-tert. amylphenoxyacetamido)benzamido]-5-pyrazolone

39.

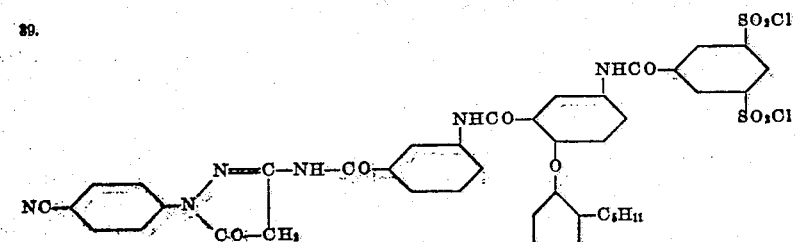

1-(p-cyanophenyl)-3-{3'-[2''-(2''',4'''-di-tert. amylphenoxy)-5''-(3''',5'''-dichlorosulfonylbenzamido)-benzamido]-benzamido}-5-pyrazolone

40.

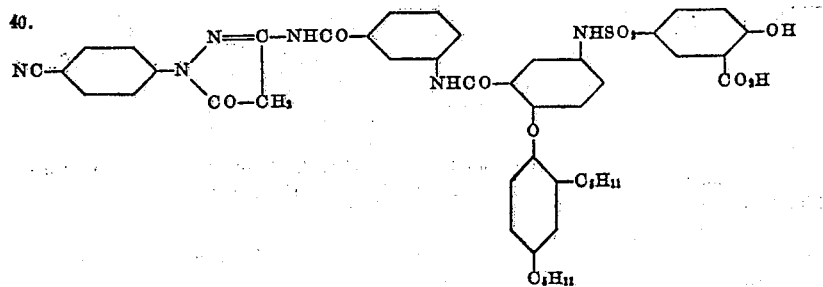

1-(p-cyanophenyl)-3-{3'-[2''-(2''',4'''-di-tert. amylphenoxy)-5''-(3'''' - carboxy - 4'''' - hydroxybenzenesulfonamido)-benzamido]-benzamido}-5-pyrazolone

41.

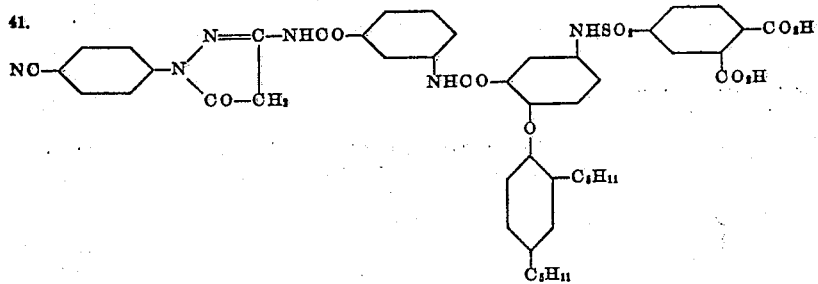

1-(p-cyanophenyl)-3-{3'-[2''-(2''',4'''-di-tert. amylphenoxy) -5''- (3''',4''' - dicarboxybenzenesulfonamido)-benzamido]-benzamido}-5-pyrazolone

42.

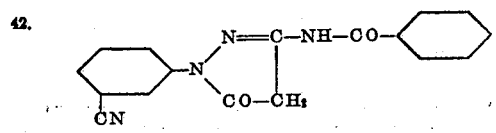

1-(m-cyanophenyl)-3-benzamido-5-pyrazolone

43.

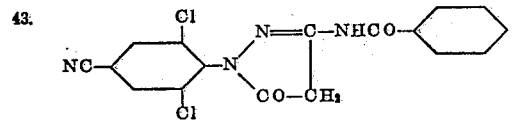

1-(2',6'-dichloro-4'-cyanophenyl)-3-benzamido-5-pyrazolone

44.

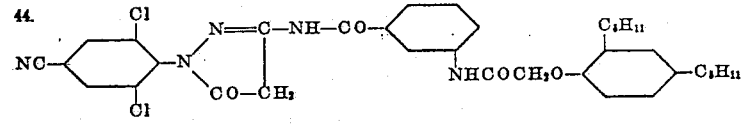

1-(2',6'-dichloro-4'-cyanophenyl)-3-[3'-(2'',4''-di-tert. amylphenoxyacetamido)-benzamido]-5-pyrazolone

45.

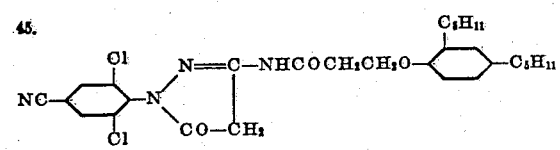

1-(2',6'-dichloro-4'-cyanophenyl)-3-[β-(2',4,-di-tert. amylphenoxy)-propionamido]-5-pyrazolone

46.

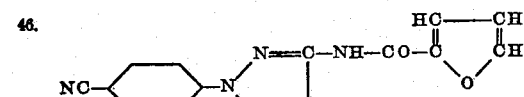

1-(p-cyanophenyl)-3-furoamido-5-pyrazolone

The compounds of our invention may be prepared as follows:

Compound 2 was prepared as follows:

1-(p-cyanophenyl)-3-benzamido-5-pyrazolone

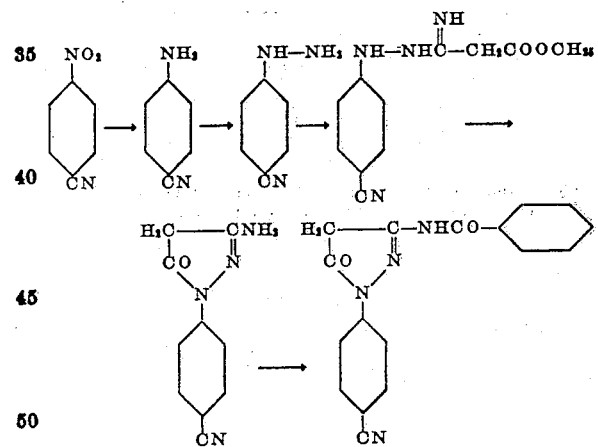

PROCEDURE

*p-Cyanoaniline* p-Nitrobenzonitrile was reduced with stannous chloride in concentrated hydrochloric acid at a temperature below 40° C. The p-cyanoaniline-tin complex was filtered from the solution and treated with crushed ice and sodium hydroxide. The p-cyanoaniline was then extracted with ether. The ether was concentrated and diluted with petroleum ether. The p-cyanoaniline separated, as small, glistening, cream-white crystals. The yield was 85–88%; M. P. 84–86°.

*p-Cyanophenylhydrazine* p-Cyanolaniline was diazotized and the cold solution of the diazonium salt was added to a cold sodium sulfite solution. The mixture was warmed to 60° C. for 30 minutes. The solution was then acidified with concentrated hydrochloric acid. The reaction mixture was then heated overnight on the steam bath. The p-cyanophenylhydrazine hydrochloride was obtained by adding concentrated hydrochloric acid to the hot solution. The hydrochloride (yield 85%) was then converted to the free base, M. P. 92–99° C.

Ethyl [β-(p-cyanophenyl)-hydrazino]-β-iminopropionate p-Cyanophenylhydrazine was added to boiling chlorobenzene, then ethyl β-ethoxy-β-iminopropionate was added and a small amount of glacial acetic acid was added as a catalyst. The mixture was refluxed for 5 minutes. The reaction mixture was then cooled overnight at 0 to 5° C. The crystals of the hydrazineiminopropionate were filtered off and washed with cold chlorobenzene and petroleum ether. The yield was 81%; M. P. 147–148° C.

1-(p-cyanophenyl)-3-amino-5-pyrazolone

A solution of sodium ethoxide was prepared from sodium and alcohol; to this was added ethyl-(p-cyanophenyl)-hydrazine-β-iminopropionate. The mixture was refluxed for 15–20 minutes, cooled to 50° C. and diluted with water and acidified with glacial acetic acid. The amino pyrazolone separated as a thick, creamy slurry. The mixture was cooled and filtered. The product was washed with water and dried at 100° C. The yield was 92%; M. P. 222–224° C. with decomposition.

1-(p-cyanophenyl)-3-benzamido-5-pyrazolone

The 1-(p-cyanophenyl)-3-amino-5-pyrazolone was dissolved in dry pyridine and two moles of benzoyl chloride were added. The mixture was heated for ten minutes on a steam bath, then cooled to room temperature and diluted with water. The product which separated was the dibenzoyl derivative (82%); M. P. 185–188°.

The dibenzoyl derivative was saponified in alcoholic potassium hydroxide. The solution was filtered and acidified with acetic acid. The 1-(p-cyanophenyl)-3-benzamido-5-pyrazolone separated as a fine, white solid. The solid was filtered, washed with water and dried. The yield was 85%. The crude product was recrystallized from dioxane. The yield was 61%; M. P. 256–257°.

Compound 1 was prepared in the same manner as compound 2, using acetyl chloride in place of benzoyl chloride.

Compound 3 was prepared in the same manner as compound 2, using o-terphenyl-4-carboxylic acid chloride in place of benzoyl chloride (see Allen, U. S. application Serial No. 737,713).

Compound 4 was prepared by reacting 2,4-diamylphenoxy acetyl chloride with 1-(p-cyanophenyl)-3-amino-5-pyrazolone as in compound 2. The acid chloride was prepared as follows:

In a 3-l. three-necked flask equipped with a stirrer, thermometer, and reflux condenser was placed 40 cc. of water and 660 cc. of ethyl alcohol, and 80 g. (2.0 moles) of sodium hydroxide. The solution was stirred, 234 g. (1.0 mole) of redistilled diamylphenol was added and the solution refluxed for five minutes. It was then cooled to 60° and 94.5 g. (1.0 mole) of chloroacetic acid added. The mixture was refluxed with stirring for three hours, cooled to room temperature, diluted with 1 l. of ice water and acidified with 200 cc. of concentrated hydrochloric acid. The diamylphenoxy acetic acid, separated as an orange-brown oil, was extracted with 200 cc. of ether and the wet ether layer concentrated under reduced pressure on the steam-bath. The heavy oil was vacuum distilled, collecting at 172–176° at 1 mm./Hg. Yield: 127 g. (43%). The viscous oil soon solidified to a wax-like solid. The diamylphenoxy acetic acid can be purified by recrystallization from hexane, M. P. 116–117°; snow-white powder.

Eighty grams (0.27 mole) of diamylphenoxy acetic acid was melted on the steam-bath and cooled to 50°. To the semi-solid was added 88 g. (0.74 mole) of thionyl chloride (redistilled over quinoline), and the mixture stirred until all of the solid dissolved. The clear liquid was placed in a 500 cc. flask equipped with stirrer and thermometer and heated with stirring at 40–45° for 4 hours. Excess thionyl chloride was removed by warming under reduced pressure at a water pump. The product was collected at 143–146°/2 mm. Yield: 65 g. (76.5%).

Compound 5 was prepared in the same manner as compound 2 using 4-(2',4'-di-tert.-amylphenoxy)-phenyl-carbamyl-n-valeryl chloride in place of benzoyl chloride.

Compound 6 was prepared by first reacting 1-(p-cyanophenyl)-3-amino-5-pyrazolone with 2-(2',4'-diamylphenoxy)-5-nitrobenzoyl chloride prepared as follows:

In a 5-l. 3-necked flask equipped with stirrer and thermometer were placed 858 g. (3.66 moles) of diamylphenol and 216 g. (3.84 moles) of potassium hydroxide pellets. The mixture was heated with stirring until the temperatures reached 130°; it was then allowed to cool to 110°, and 302 g. (1.5 moles) of 2-chloro-5-nitrobenzoic acid was added. The thick mixture was stirred and heated until the temperature reached 125°, whereupon a spontaneous reaction took place and the temperature rose to 145°. The slurry became much more fluid and the steam from the reaction was allowed to escape through the open neck of the flask. The reaction mixture was heated with stirring for 1½ hrs. at 140–150°. The melt was then stirred into 4.5 l. of benzene. When the melt had been well digested, the suspension of yellow solid was filtered off and discarded.

The dark brown liquid was placed in a 12-l. flask, the solution was stirred very vigorously with 3 l. of water and 600 cc. of concentrated hydrochloric acid. The aqueous layer was removed and the benzene layer was washed with 1 l. of hot water. The benzene solution was concentrated to about 2.5 l.; it was cooled to 10° for several hours or overnight. Crude 2-(2',4'-diamyl-phenoxy)-5-nitrobenzoic acid was filtered, washed on the funnel with 700 cc. of benzene, followed by 700 cc. of petroleum ether (950) and dried at 100°. The yield was 350–365 g. (58–61%); it melted at 182–185°, with sintering at 175°.

For purification, 350 g. of the above acid was dissolved in 4 l. of hot ethyl alcohol and the product was allowed to crystallize overnight. The crystalline cake was broken up, filtered, washed with 500 cc. of ethyl alcohol and dried at 100°. The yield was 264 g. (75% recovery); it melted at 186–188°, with sintering at 180°.

This acid was again recrystallized from 2.75 l. of ethyl alcohol. The recovery was 204 g. (77.7%) (34.8% overall yield); it melted at 189–191°, with sintering at 185°.

The acid chloride was prepared from the 2-(2',4'-diamylphenoxy)-5-nitrobenzoic acid in the usual manner.

This is compound 35. The nitro group was reduced to obtain compound 34. To obtain compound 6, compound 34 was condensed with p-amyl benzoyl chloride.

Compound 7 was prepared by first reacting 1-(p-cyanophenyl)-3-amino-5-pyrazolone with 4-(2',4'-diamylphenoxy)-3-nitrobenzoyl chloride prepared as follows:

In a 5-l. 3-necked flask equipped with stirrer and thermometer was placed 858 g. (3.66 moles) of purified diamyl phenol and the flask and contents were heated with a free flame to 115–210°. Heating was then stopped and 216 g. (3.84 moles) of potassium hydroxide pellets were added with stirring in 30–40 g. portions. The addition took about 20 min. and the temperature rose to 140–145°.

The reaction mixture was allowed to cool to 125° and then 302 g. (1.5 moles) of 4-chloro-3-nitrobenzoic acid was added at such a rate as to keep the temperature at 140–145°. This addition took 20–30 min. The temperature was maintained at 140–150° for 1.5 hrs. after the addition was completed. The hot melt was poured into 4–5 l. of benzene and allowed to stand overnight. Then it was filtered and acidified by stirring it vigorously with 600 cc. of concentrated hydrochloric acid in 3 l. of water. The benzene layer was separated and the solvent was removed under reduced pressure. The residue was dissolved in 2.5 l. of petroleum ether (B. P. 35–55°) and kept in the refrigerator overnight. The next morning the separated solid was filtered, washed twice with 100-cc. portions of cold petroleum ether and crystallized from 8 parts of ligroin. Yield of 4-(2,4-diamylphenoxy)-3-nitrobenzoic acid, M. P. 174–176°, was 267 g. or 43%. The crude product weighed 303.5 g. (48.5%) and had a M. P. of 168–170°.

In a 2-l. flask were mixed 432 g. (1.08 moles) of 4-(2,4-diamylphenoxy)-3-nitrobenzoic acid and 980 g. (8.25 moles; 600 cc.) of thionyl chloride. The flask was equipped with a condenser carrying a drying tube, and shaken occasionally until solution was complete (about 0.5 hr.). The reaction mixture was allowed to stand overnight at room temperature and then heated for 4 hrs. at 40–50° (this is best done in a water bath). A brisk evolution of gas began shortly after the reactants were mixed and stopped after 2–3 hrs. of heating.

The flask was equipped with a stillhead and the excess thionyl chloride was removed under diminished pressure. Removal of the excess thionyl chloride was considered complete when constant weight was reached. The yield of 4-(2,4-diamylphenoxy)-3-nitrobenzoyl chloride was 450 g., which is 100% of the theoretical. The use of the crude product gives satisfactory results.

This is compound 33. To obtain compound 7, the nitro group was reduced, and the reduction product condensed with p-amyl benzoyl chloride.

Compounds 8 to 26 were prepared in the same manner as compound 2, using the appropriate acyl chloride in place of benzoyl chloride.

Compound 27 was prepared as follows:

1-(p-Cyanophenyl)-3-(3'-nitrobenzamido)-5-pyrazolone

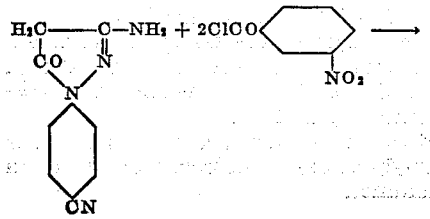

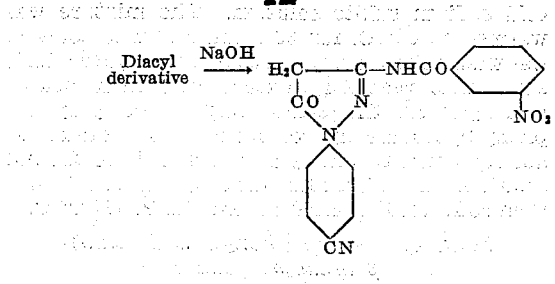

In a 1-l. round-bottomed flask equipped with a reflux condenser were placed 50 g. (0.25 mole) of recrystallized 1-p-cyanophenyl-3-amino-5-pyrazolone, 625 ml. of glacial acetic acid and 93 g. (0.5 mole) of m-nitrobenzoyl chloride. The mixture was heated to boiling and refluxed for 30 mins. A clear solution was formed but the product began to separate while still hot. The reaction mixture was cooled to room temperature, filtered, washed with 500 ml. of ethyl alcohol and 500 ml. of ether, and dried at 100°. The yield was 68.5 g.

*Saponification.*—The diacyl product was run through a 40-mesh sieve to obtain a product without lumps. Sixty-five and one-half grams (0.14 mole) of the finely divided diacyl compound was suspended in 1 l. of 70% ethyl alcohol. The suspension was heated to 70° and 25 ml. (0.35 mole) of 40% caustic was stirred into the mixture. The stirring was continued vigorously for 60 seconds before the mixture was acidified with 25 ml. of glacial acetic acid. The monoacyl product separated at once. The slurry was stirred and cooled to room temperature. The product was filtered, washed with 200 ml. of ethyl alcohol and 200 ml. of ether, and dried at 100°. The yield of material melting at 254–255° was 53 g. (61%).

In a 2-l. round-bottomed flask fitted with a reflux condenser were placed 53 g. (0.152 mole) of 1-(p-cyanophenyl)-3-(3'-nitrobenzamido)-5-pyrazolone and 1325 ml. of 90% acetic acid. The mixture was heated to boiling and 53 g. of iron powder was added. The charge was refluxed for 15 min. or until all of the nitro compound had dissolved. The solution was then filtered and stirred into 2 l. of boiling water. This mixture was heated to boiling, cooled to room temperature and filtered. The amine was washed with 200 ml. of ethyl alcohol, then with 200 ml. of ether and dried at 100°. The yield of buff-colored powder was 35 g. (72%); M. P. 245–247°.

This product was reacted with α-diamyl-n-butyryl chloride prepared as follows:

In a 3-l. three-necked flask, equipped with a stirrer, thermometer and reflux condenser was placed 40 cc. of water and 660 cc. of ethyl alcohol. In this alcohol was dissolved 80 g. (2.0 mole) of caustic soda pellets by stirring and heating at a boil. Stirring was maintained throughout the preparation. To this hot solution was added 234 g. (1.0 mole) of redistilled diamyl phenol and refluxing was continued for 5 minutes. The solution was cooled externally to 60° C. and 167 g. (1.0 mole) of α-bromo-n-butyric acid was added. The temperature of the solution rose 15° C. The solution was heated to a boil and boiling under the reflux was maintained for 3 hours. Some separation of salt occurred.

The mixture was cooled externally to room temperature and diluted with 1-l. of ice water and 200 cc. of concentrated hydrochloric acid. The resulting mixture showed a strong acidity on Congo paper. The oily product was extracted with 500 cc. of ethyl ether (tech.) and the ether extract washed with 500 cc. of water. The ether solution was separated and transferred to a suitable Claisen flask. The moist ether extract is concentrated by distillation, final traces of ether and water being removed by suction.

The syrupy residue was distilled in vacuo, an oil bath being used until all traces of diamyl phenol had been recovered. In the distillation a forerun of about 15 g. was collected up to 110°/1 mm. The diamyl phenol was collected at 111–169°/1 mm, 130 g. of it being recovered. Nearly all of the diamyl phenol boils at 123–125°/1 mm. The oil bath was removed and the α-diamylphenoxy-n-butyric acid was distilled over a flame. The product was collected at 170–200°/1 mm. This product can be recognized by the sudden increase in the viscosity of the distillate. No appreciable residue was left in the still. Yield: 125 g. (39%).

In a 500 cc. Claisen flask was placed 160 g. (0.5 mole) of α-diamyl phenoxy-n-butyric acid and 160 g. (1.35 mole) of thionyl chloride (distilled over quinoline). On being warmed to 40° C. a gentle evolution of sulfur dioxide and hydrogen chloride commenced in the clear amber liquid. The temperature was held at 40–45° C. until the evolution of gas had ceased. This generally occurred after three hours.

Excess thionyl chloride was removed by distillation, final traces of it being distilled by vacuum at the water pump. The α-diamylphenoxy-n-butyric chloride was distilled at 138–140°/1 mm. Yield: 150 g. (90%).

Compound 28 was prepared by reacting 1-(p-cyanophenyl)-3-amino-5-pyrazolone with p-nitrophenyl acetyl chloride, reducing the nitro group to —NH₂, and reacting it with 2,4-diamyl phenoxy acetyl chloride.

Compound 29 was prepared by reacting 1-(p-cyanophenyl)-3-amino-5-pyrazolone with m-nitrophenyl acetyl chloride, reducing the nitro group to —NH₂, and reacting it with 2,4-diamyl phenoxy acetyl chloride.

Compound 30 was prepared by first reacting 1-(p-cyanophenyl)-3-amino-5-pyrazolone with p-nitrobenzoyl chloride similarly to the preparation of compound 27, then reducing the nitro group to —NH₂, and reacting it with 2,4-diamyl phenoxy acetyl chloride.

Compound 31 was prepared by condensing 1-(p-cyanophenyl)-3-amino-5-pyrazolone in dioxane, either with or without quinoline as an acid acceptor, with two moles of 4-(2,4-diamylphenoxy)-3-nitrobenzoyl chloride (see compound 7) to form a diacylated compound. The diacylated compound was hydrolyzed to 1-(p-cyanophenyl)-3-[4'-(2'',4''-di-tert.-amylphenoxy)-5'-nitrobenzamido]-5-pyrazolone. This was reduced by use of iron and acetic acid to the corresponding amine, which was then condensed in acetic acid with p-methyl benzoyl chloride, sodium acetate being used as a base.

Compound 32 was prepared by the same procedure as compound 31, using p-chlorobenzoyl chloride in place of p-methyl benzoyl chloride.

The preparation of compound 33 is described under the preparation of compound 7.

The preparation of compounds 34 and 35 is described under the preparation of compound 6.

Compound 36 was prepared by condensing 1-(p-nitrophenyl)-3-amino-5-pyrazolone with 4'-tert.amyl-3-phenoxy-benzoyl chloride prepared as follows:

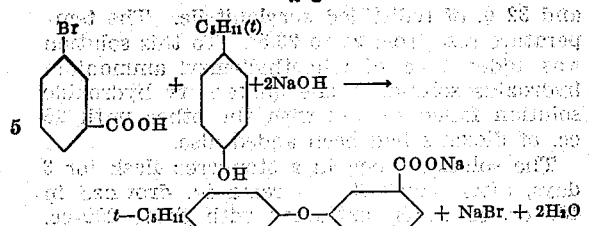

In a 2-l. 3-necked flask, equipped with a mechanical stirrer, a wide bent tube leading to a condenser set for downward distillation, and a 400° thermometer were placed 161 g. (0.80 mole) of m-bromobenzoic acid, 520 g. (3.17 mole) of p-tert.-amyl-phenol, 80 g. (2.0 mole) of granular sodium hydroxide (technical) and 1.6 g. of copper bronze powder. The mixture was warmed with a low flame until enough amylphenol was melted to allow mechanical stirring. The temperature was then raised while stirring rapidly; at about 150° the mixture tended to re-solidify with the evolution of steam. By means of a flame in continuous motion, the mixture was heated to its boiling point (270°); considerable amylphenol escaped with the steam, and was collected. As the temperature of the reddish-tan mixture approached the boiling point, the solid re-melted and became readily stirable.

After all traces of water had escaped, the bent tube was replaced by an air condenser and the mixture was heated with stirring at the boiling point (270° C.) for 3½ hours. The hot molten mixture was then poured into 5 l. of water containing 80 g. of sodium carbonate. The cooled aqueous mixture was extracted twice using 2 l. portions of technical ethyl ether, the extracts being discarded. The copper bronze was conveniently filtered at this point.

The aqueous solution was then acidified with 400 cc. of concentrated hydrochloric acid, the 4'-tert.-amyl-3-phenoxybenzoic acid separating as a cream-colored crystalline solid. The acid was extracted with 2500 cc. of technical ethyl ether. The clear, brown, etheral solution was dried over 100 g. of anhydrous calcium chloride and stirred for 5 minutes with 20 g. of Darco. The ethereal solution was then filtered by suction. When the clear, red-brown filtrate was concentrated on the steam-bath, 4'-tert.-amyl-3-phenoxybenzoic acid crystallized as a pale, tan solid. It was contaminated by small amounts of tert. amyl phenol; most of this was removed by extraction with 1200 cc. of hexane at room temperature. The 4'-tert.-amyl-3-phenoxybenzoic acid thus obtained melted at 134–136°. The yield was 170 g. (75%).

The acid chloride was obtained by treatment with thionyl chloride in the usual way.

Compound 37 was prepared by condensing 1-(p-cyanophenyl)-3-amino-5-pyrazolone with β-2,4-di-tert. amylphenoxy propionyl chloride as described in the preparation of compound 2. The propionyl chloride was prepared as follows:

β-2,4-tert.-Diamylphenoxypropionitrile

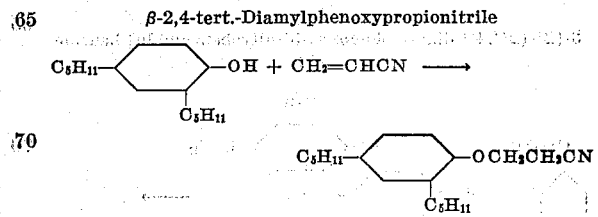

In a 200-cc. round-bottomed flask was placed 47 g. (0.2 mole) of diamylphenol (alkali-washed)

and 32 g. of redistilled acrylonitrile. The temperature rose from 24 to 26.5°. To this solution was added 4 cc. of trimethylbenzyl ammonium hydroxide solution. The quaternary hydroxide solution failed to mix with the other until 25 cc. of dioxane had been added also.

The solution stood in a stoppered flask for 3 days, after which it was removed, drowned in 400 cc. of water, extracted with three 200-cc. portions of ether, the emulsion being broken with 4 g. of barium chloride. The ether solution was washed with three 200-cc. portions of water, dried over sodium or magnesium sulfate, filtered, and concentrated by distillation on a steam bath.

The residual liquid was distilled in vacuo at 136–142°/1 mm. Yield=47 g. (82%).

β-2,4-Di.tert. amylphenoxy propionic acid

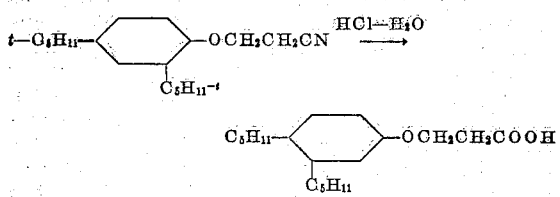

40 g. of β-2,4-di. tert. amylphenoxy propionitrile was dissolved in 200 cc. glacial acetic acid and placed in a 500 cc. round-bottom flask under a vertical condenser. To this solution was added 25 cc. of concentrated hydrochloric acid, a turbid mixture resulting. This mixture was heated on a steam bath and 35 cc. additional hydrochloric acid was added portion-wise during one half an hour, a clear solution being obtained. This solution was heated for 20 hours on the steam bath and allowed to cool for two days, a mass of crystals being formed. The crystalline mixture was diluted with 150 cc. of water, filtered by suction and the solid washed on the funnel with 1 l. of water.

The β-2.4-di-tert. amylphenoxy propionic acid was dried. Yield: 39 g.

The solid acid was converted to the acid chloride in the usual way with thionyl chloride.

Compound 38 was prepared by reacting 2,4-diamylphenoxy acetyl chloride (see compound 4) with 1-(p-cyanophenyl)-3-(3'-amino-benzamido)-5-pyrazolone (see compound 27).

Compound 39 was prepared as follows:

1-(p-cyanophenyl)-3-amino-5-pyrazolone was condensed with 3-[2'-(2'',4''-diamylphenoxy)-5'-nitrobenzamido]-benzoyl chloride to yield 1-(p-cyanophenyl) - 3-{3'-[2''-(2''' (4'''-di-tert.-amylphenoxy)-5''-nitrobenzamido] - benzamido}-5-pyrazolone, sodium acetate being used as a condensing agent. This nitro compound was reduced with iron and acetic acid to the corresponding amine which in turn was condensed in dioxane with one mole of 3,5-di-(chlorosulfonyl)-benzoyl chloride, quinoline being used as a condensing agent.

3-[2'-(2'',4''-diamylphenoxy)-5'-nitrobenzamido]-benzoic acid

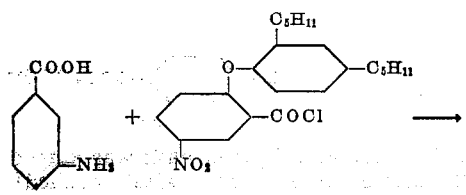

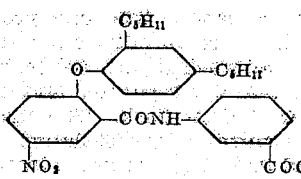

In a 3-necked 500-ml. flask was mixed 13.7 g. of m-amino-benzoic acid, 11.8 ml. of dry quinoline and 150 ml. of dry dioxane. The flask was equipped with stirrer, dropping funnel and condenser carrying a drying tube, and heated on a steam bath. A solution of 41.7 g. of 2-(2',4'-di-amylphenoxy)-5-nitrobenzoyl chloride in 150 ml. of dry dioxane was added to the flask in 40 min., and heating on the steam bath continued for one hour. The cold solution was poured into 1 l. of cold water and the solid precipitate was filtered, washed several times with water and dried. The dry product was crystallized from 15 parts of ethyl alcohol. A white solid (36 g.), melting at 215–216°, was obtained.

The acid chloride was obtained by treatment with thionyl chloride.

Compound 40 was synthesized the same as compound 39, 5-chlorosulfonyl salicylic acid (J. Chem. Soc. 121, 2559 (1922)) being substituted for 3,5-di-(chlorosulfonyl)-benzoyl chloride as the last step.

Compound 41 was synthesized the same as compound 39, 3-chlorosulfonyl phthalic acid (Ann. 233, 228 (1886)) being substituted for 3,5-di-(chlorosulfonyl)-benzoyl chloride as the last step.

Compound 42 was prepared the same as compound 2, using m-nitrobenzonitrile in place of p-nitrobenzonitrile.

Compound 43 was prepared the same as compound 2, using 2,6-dichloro-4-cyanophenylhydrazine in place of p-cyanophenyl hydrazine. The 2,6-dichloro-4-cyanophenylhydrazine was prepared as follows:

35 g. of the 2,6-dichloro-4-cyanoaniline was stirred into 250 ml. of concentrated hydrochloric acid and the solution cooled to 0° C. 13 g. of finely ground sodium nitrite was added in the solid form to the stirred solution at 0–8° C. The solution was stirred two hour longer below 10° C.

In the meantime 137 g. of stannous chloride was dissolved in 200 ml. of concentrated hydrochloric acid and the solution cooled to 0°. At this temperature the diazo solution prepared above was added to the stannous chloride and the mixture stirred one hour longer while cooling. The solid formed was filtered by suction and washed twice with saturated sodium chloride solution.

The hydrazine tin complex was dissolved in 600 ml. of water and the solution made alkaline with 40% sodium hydroxide solution, while cooling to less than 10°. The solid formed was filtered, washed free of alkali with water and dried. From benzene the product melted at 131–3° C.

| | Calc. | Found |
|---|---|---|
| C | 41.5 | 42.4 |
| H | 2.5 | 2.9 |
| N | 20.8 | 20.0 |

2,6-dichloro-4-cyanoaniline p-Cyanoaniline hydrochloride (200 g.) was dissolved in 1200 ml. of concentrated hydrochloric acid and the solution heated to 50°. A solution of 122 g. of potassium chlorate in 1400 ml. of water was added to the acid solution above, with stirring and cooling to keep the temperature of the reaction mixture at 50–60°. The addition took about two hours, and the stirring at the same temperature was continued two hours longer. The reaction mixture was poured into 30 l. of cold water; the solid formed was filtered, washed well with water, and dried. The dry product was crystallized from benzene, thus obtaining white needles having a melting point of 117–118°. A yield of 77.5% was obtained.

Compound 44 was prepared in the same way as compound 38, the 2,6-dichloro-4-cyanophenylhydrazine being used in preparation of the amino pyrazolone.

Compound 45 was prepared in the same way as compound 37, the 2,6-dichloro-4-cyanophenylhydrazine being used in preparation of the amino pyrazolone.

Compound 46 was prepared in the same way as compound 2, using α-furoyl chloride in place of benzoyl chloride.

As stated above, certain of our compounds may be used in developing solutions containing a primary aromatic amino developing agent. Compounds 1, 2, 8 to 26, 42 and 43 may be used in this way. The following example illustrates a developing solution which may be used with the compounds of our invention.

A

| | Grams |
|---|---|
| p-Amino diethylaniline sulfate | 2 |
| Sodium sulfite (anhydrous) | 5 |
| Sodium carbonate (anhydrous) | 20 |
| Potassium bromide | 2 |
| Water to 1 liter | |

B 1-p-cyanophenyl-3-acetamido-5-pyrazolone grams__ 2
Sodium hydroxide (2% solution) _____cc__ 50
For use, B is added to A.

Certain of our couplers may be incorporated in sensitive emulsion layers in the manner described in Mannes and Godowsky U. S. Patent 2,304,940 or Jelley and Vittum 2,322,027. Compounds 3 to 7, 27 to 38, 44 and 45 may be used in this way. For example, compound 4, 1-(p-cyanophenyl)-3-(2′,4′-di-tert. amylphenoxy acetamido)-5-pyrazolone may be incorporated in a silver halide emulsion as described in Example 1 of Jelley and Vittum 2,322,027. When used in this way, the exposed emulsion layer is developed in a solution having the composition of Part A of the developing solution described above.

Certain of our compounds may also be incorporated directly in a gelatino silver halide emulsion layer as described in Fischer U. S. Patent 1,055,155. Compounds suitable for use in this way are compounds 39, 40 and 41.

The aromatic amino developing agents used with the coupler compounds of our invention include the mono-, di- and tri-amino aryl compounds and their derivatives formed by substitution in the amino group as well as in the ring such as alkyl phenylene diamines and alkyl toluylene diamines. These compounds are usually used in the salt form such as the hydrochloride or the sulfate which are more stable than the amines themselves. Suitable compounds are diethyl-p-phenylene diamine hydrochloride, monoethyl-p-phenylene diamine hydrochloride, dimethyl-p-phenylene diamine hydrochloride, dimethyl-p-phenylene sulfate and 2-amino-5-diethyl amino toluene sulfate. The p-amino phenols and their substitution products may also be used where the amino group is unsubstituted. All of these compounds have an unsubstituted amino group which enables the oxidation products of the developer to couple with the color-forming compounds to form a dye image.

Our development process may be employed for the production of colored photographic images in layers of gelatin or other carrier for the silver halide such as collodion, organic esters of cellulose or synthetic resins. The support for the emulsion may be a transparent material such as glass, cellulose ester or a non-transparent reflecting material such as paper or an opaque cellulose ester. The emulsion may be coated as a single layer on the support or as superposed layers on one or both sides of the support. The superposed layers may be differentially sensitized to form natural color photographic images in the well-known manner. For example, in a multilayer material sensitized to red, green and blue light, respectively, our couplers would ordinarily be used in the green-sensitive emulsion layer to form the magenta image.

Dyes formed from the couplers of our invention have an absorption maximum in the green spectral region which is shifted toward the red by about 50 to 200 millimicrons as compared with corresponding couplers without the cyano group. At the same time, there is little or no increase in absorption in the blue and red regions of the spectrum.

We claim:

1. A color-forming photographic developer comprising a primary aromatic amino developing agent and a coupler compound having the formula:

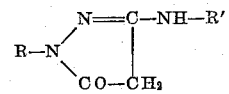

where R is a mononuclear cyanoaryl radical and R′ is a carboxylic acid acyl radical.

2. A color-forming photographic developer comprising a primary aromatic amino developing agent and a coupler compound having the formula:

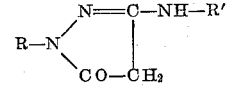

where R is a p-cyanophenyl radical and R′ is a carboxylic acid acyl radical.

3. A color-forming photographic developer comprising a primary aromatic amino developing agent and a coupler compound having the formula:

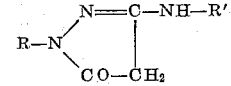

where R is a p-cyanophenyl radical and R′ is a benzoyl radical.

4. A color-forming photographic developer comprising a primary aromatic amino developing agent and a coupler compound having the formula:

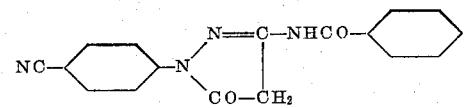

5. The method of producing a colored photographic image in a silver halide emulsion layer which comprises exposing said layer and developing it with a primary aromatic amino developing agent in the presence of a coupler compound having the formula:

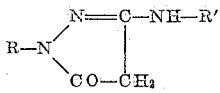

where R is a mononuclear cyanoaryl radical and R' is a carboxylic acid acyl radical.

6. The method of producing a colored photographic image in a silver halide emulsion layer which comprises exposing said layer and developing it with a primary aromatic amino developing agent in the presence of a coupler compound having the formula:

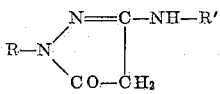

where R is a p-cyanophenyl radical and R' is a carboxylic acid acyl radical.

7. The method of producing a colored photographic image in a silver halide emulsion layer which comprises exposing said layer and developing it with a primary aromatic amino developing agent in the presence of a coupler compound having the formula:

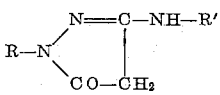

where R is a p-cynanophenyl radical and R' is an acyl group derived from an aliphatic acid.

8. The method of producing a colored photographic image in a silver halide emulsion layer which comprises exposing said layer and developing it with a primary aromatic amino developing agent in the presence of a coupler compound having the formula:

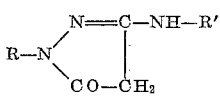

where R is a p-cyanophenyl radical and R' is an acyl group derived from an aromatic acid.

9. The method of producing a colored photographic image in a silver halide emulsion layer which comprises exposing said layer and developing it with a primary aromatic amino developing agent in the presence of a coupler compound having the formula:

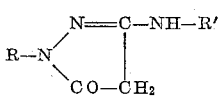

where R is a p-cyanophenyl radical and R' is an acyl group derived from a benzoic acid.

10. The method of producing a colored photographic image in a silver halide emulsion layer which comprises exposing said layer and developing it with a primary aromatic amino developing agent in the presence of a coupler compound having the formula:

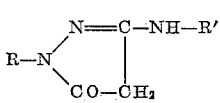

where R is a p-cyanophenyl radical and R' is a benzoyl radical.

11. A photographic emulsion for forming colored images comprising a silver halide emulsion having incorporated therein a coupler compound having the formula:

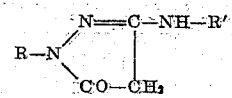

where R is a mononuclear cyanoaryl radical and R' is a carboxylic acid acyl radical.

12. A photographic emulsion for forming colored images comprising a silver halide emulsion having incorporated therein a coupler compound having the formula:

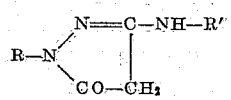

where R is a p-cyanophenyl radical and R' is a carboxylic acid acyl radical.

13. A photographic emulsion for forming colored images comprising a siver halide emusion having incorporated therein a coupler compound having the formula:

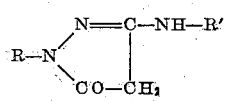

where R is a p-cyanophenyl radical and R' is a benzoyl radical.

14. A photographic emulsion for forming colored images comprising a silver halide emulsion having incorporated therein a coupler compound having the formula:

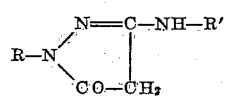

where R is a p-cyanophenyl radical and R' is a benzoyl radical containing an ether linkage.

15. A photographic emulsion for forming colored images comprising a gelatino-silver halide emulsion having uniformy dispersed therein a liquid coupler solvent containing in solution a coupler compound of the formula:

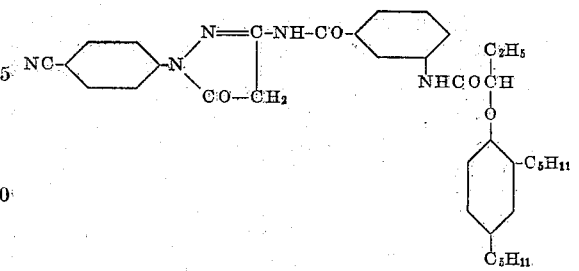

16. A photographic emulsion for forming colored images comprising a gelatino-silver halide emulsion having uniformly dispersed therein a liquid coupler solvent containing in solution a coupler compound of the formula:

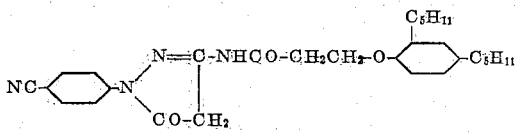

ARNOLD WEISSBERGER.
PAUL W. VITTUM.
CHARLES O. EDENS.

REFERENCES CITED

The following references are of record in the file of this patent:

UNITED STATES PATENTS

| Number | Name | Date |
|---|---|---|
| 2,343,702 | Porter et al. | Mar. 7, 1944 |
| 2,369,489 | Porter et al. | Feb. 13, 1945 |